R. H. SMITH.
FISHING HOOK LEADER ADJUSTING TERMINAL AND OUTRIGGER DEVICE.
APPLICATION FILED APR. 16, 1917.
1,252,621. Patented Jan. 8, 1918.
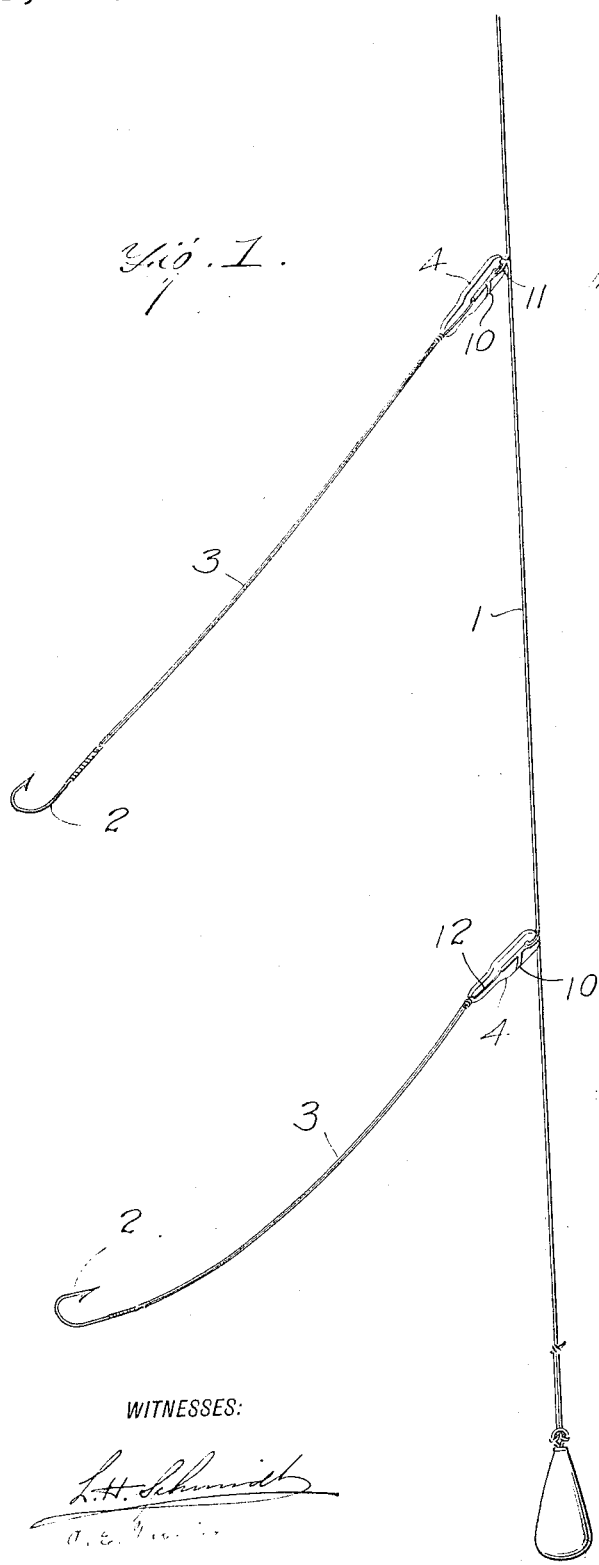
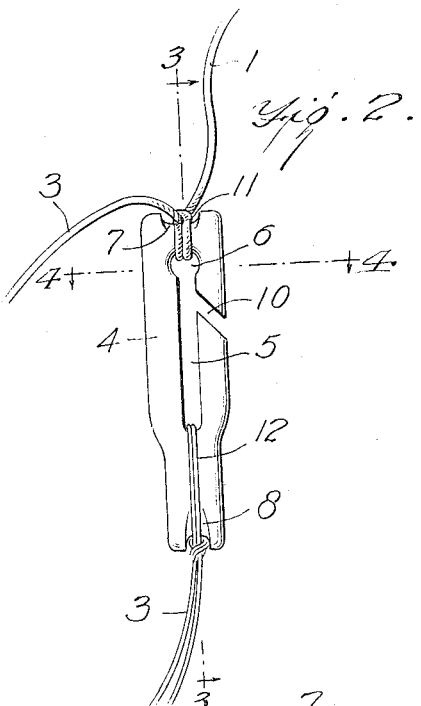
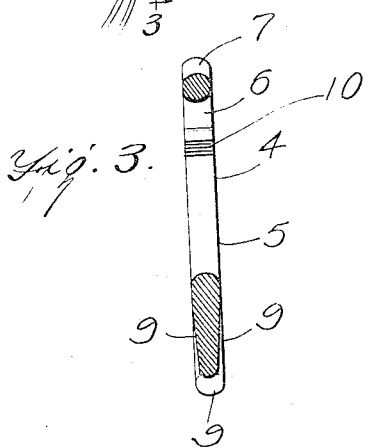
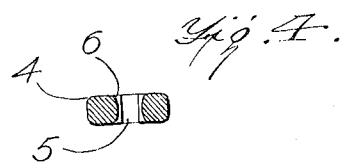
WITNESSES:
INVENTOR
RICHARD H. SMITH,
BY
ATTORNEYS

UNITED STATES PATENT OFFICE.

RICHARD HENRY SMITH, OF SAVANNAH, GEORGIA.

FISHING-HOOK-LEADER-ADJUSTING TERMINAL AND OUTRIGGER DEVICE.

1,252,621.　　　　Specification of Letters Patent.　　Patented Jan. 8, 1918.

Application filed April 16, 1917.　Serial No. 162,367.

*To all whom it may concern:*

Be it known that I, RICHARD HENRY SMITH, a citizen of the United States, and a resident of Savannah, in the county of Chatham and State of Georgia, have invented a new and useful Improvement in Fishing-Hook-Leader-Adjusting Terminal and Outrigger Devices, of which the following is a specification.

My invention is an improved device for attachment to fishing lines, the same being adapted to be quickly connected with the line and adjusted to any desired position along the same. The details of construction of the device are hereinafter described, and illustrated in the accompanying drawings, in which—

Figure 1 is a front view of the main line with the hooks attached,

Fig. 2 is a plan view of the outrigger device, and

Figs. 3 and 4 are sections on the lines 3—3 and 4—4, respectively of Fig. 2, each view looking in the direction adjacent to the line.

The invention is shown in connection with a main line 1 of the usual construction and with hooks 2, having snoods 3 for connecting the said hooks with the main line.

Each of the outrigger devices comprises a narrow elongated bar 4 of suitable material, as for instance, bone or metal of light weight as aluminum, and the said plate or bar is provided with a longitudinally extending slot 5, having one end slightly enlarged or rounded as shown at 6.

The ends of the plate or bar are recessed or notched as shown at 7 and 8, respectively, that end of the bar having the notch or recess 8 is reduced in thickness or diameter and thus slightly tapered; which form facilitates the attachment and removal of a snood. An oblique slot or passage 10 leads laterally from the central slot 5, the same being open at both ends.

In use, the main line 1 is looped or double hitched for engaging the outrigger and each leader 3 has a loop 12 for the same purpose. The loops 11 are double loops as shown, arranged to be tightened or loosened, and the said loops engage that end of the bar at the notch or recess 7.

By loosening this loop 11 slightly it may be worked out of the notch 7 and over the end of the bar to permit the disengagement of the loop from the slot 5 through the passage 10, and in the same manner the loop 12 of the leader may be worked over the ends of the bar and may be disengaged from the slot through the passage 10.

In connecting the snoods to the main line the outrigger is slipped through the loop 11, which is tightened in the notch 7 after which the loop 12 of the main line is slipped through the slot or passage 10 and tightened in the recess 8. It will be evident that as many leaders may be attached to the line as may be desired in a very short space of time and without knotting the line.

The improved outriggers will be made in various sizes for different purposes.

I claim:—

A device for attaching snoods to fishing lines comprising a bar having its body provided with a central longitudinal slot and its ends with notches arranged in alinement with said slot, and an open oblique slot leading from the central one, as shown and described.

RICHARD HENRY SMITH.

Witnesses:
　R. D. ERNEST,
　C. R. RABEY.